J. RABER.
PAYING AND RECORDING MACHINE.
APPLICATION FILED NOV. 17, 1914.

1,217,498.

Patented Feb. 27, 1917.
14 SHEETS—SHEET 4.

Fig. 4.

Witnesses
E. R. Barrett
C. J. Schmidt

Inventor
Joseph Raber

Offield, Towle,
Graves & Offield
Attorneys

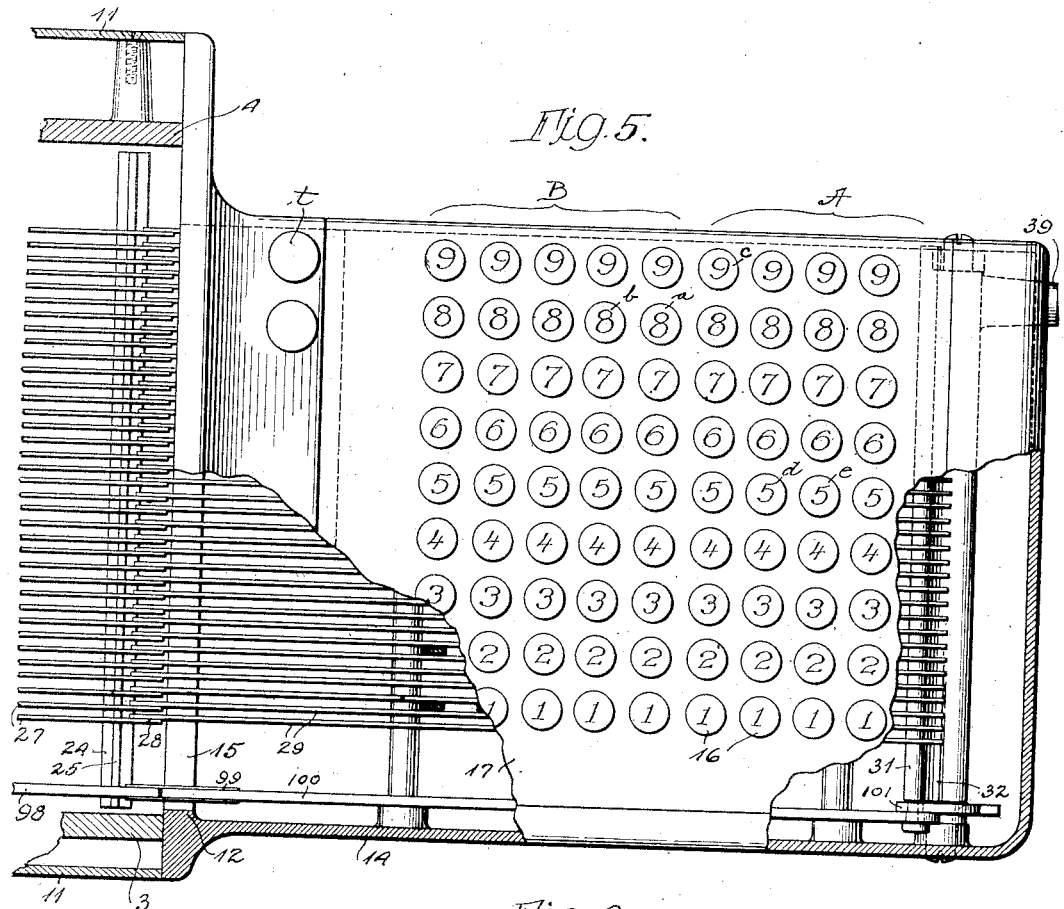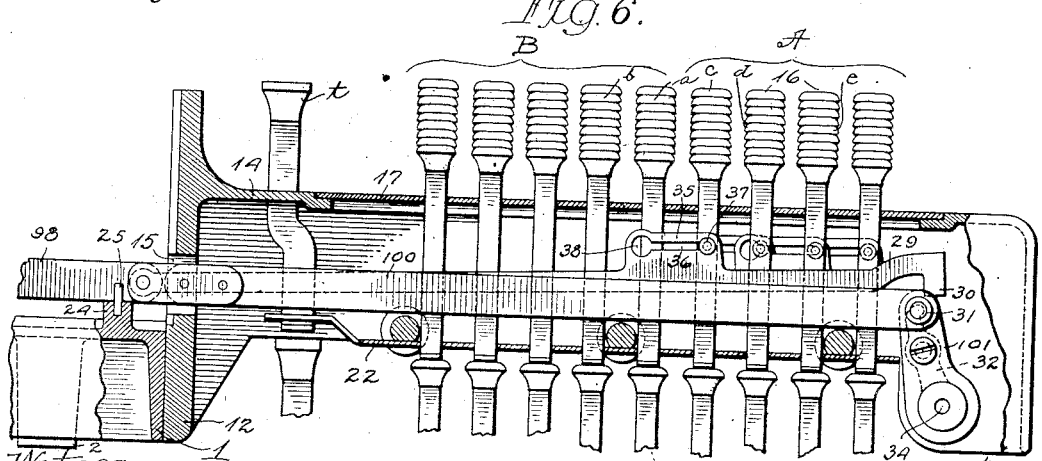

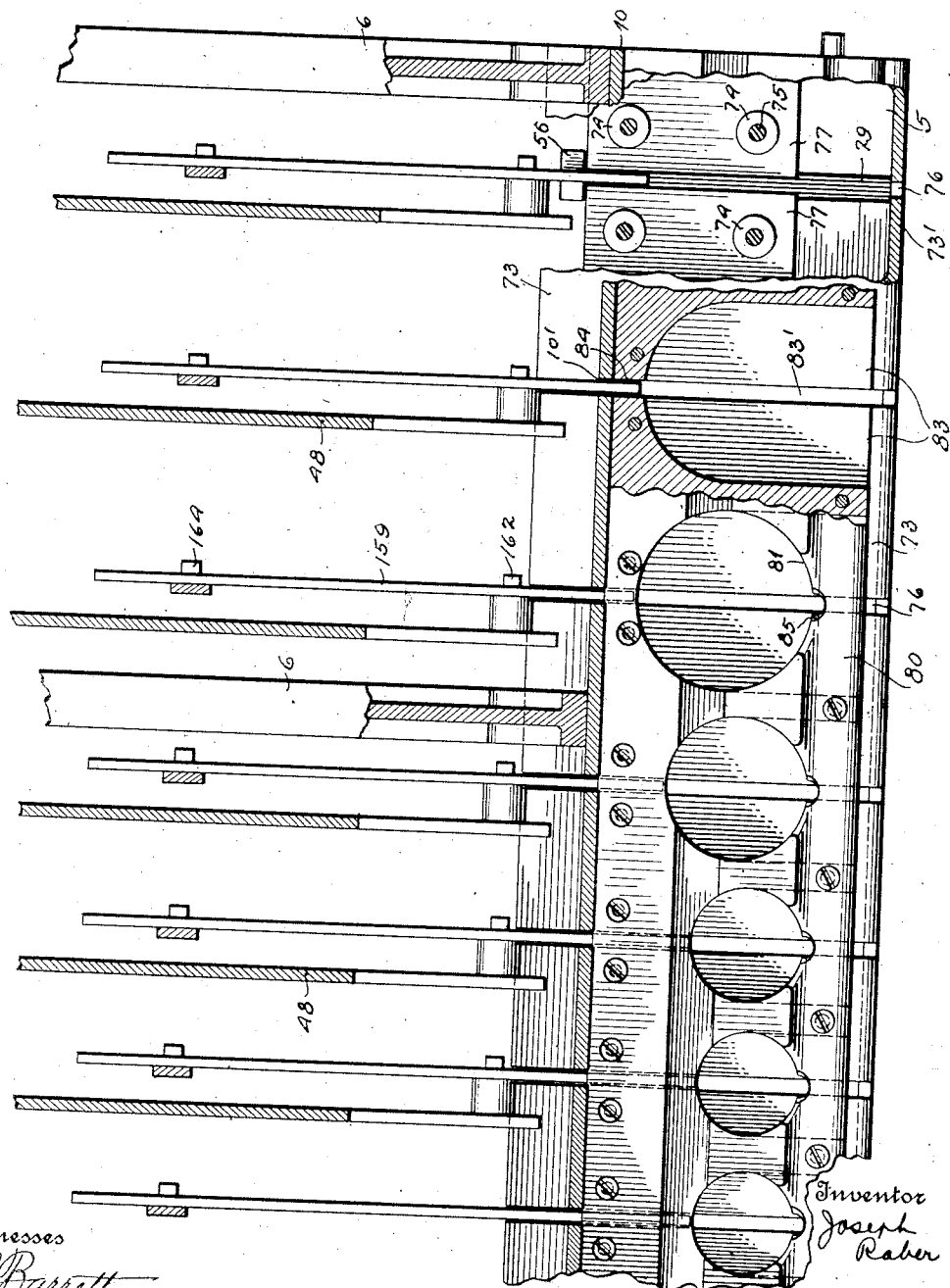

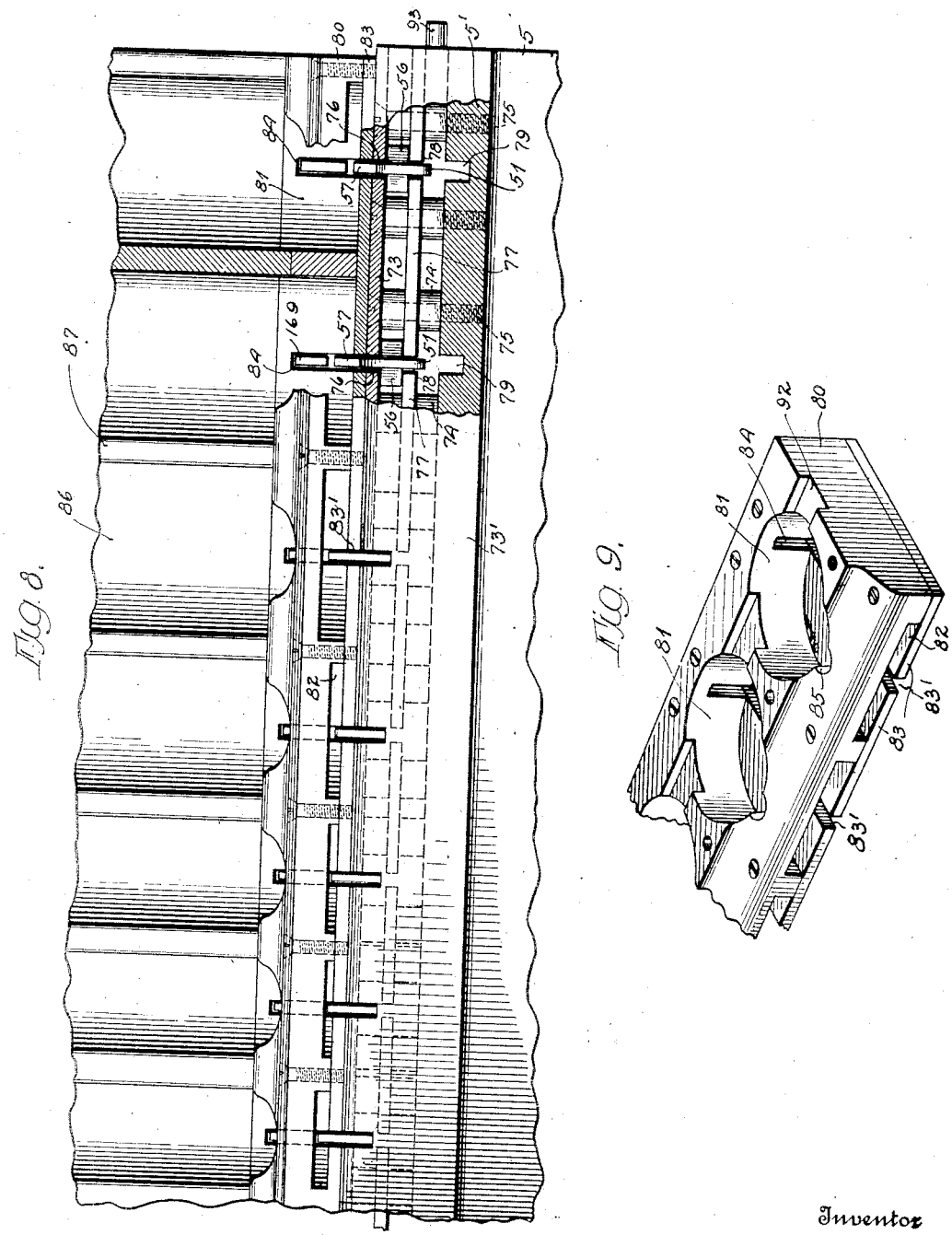

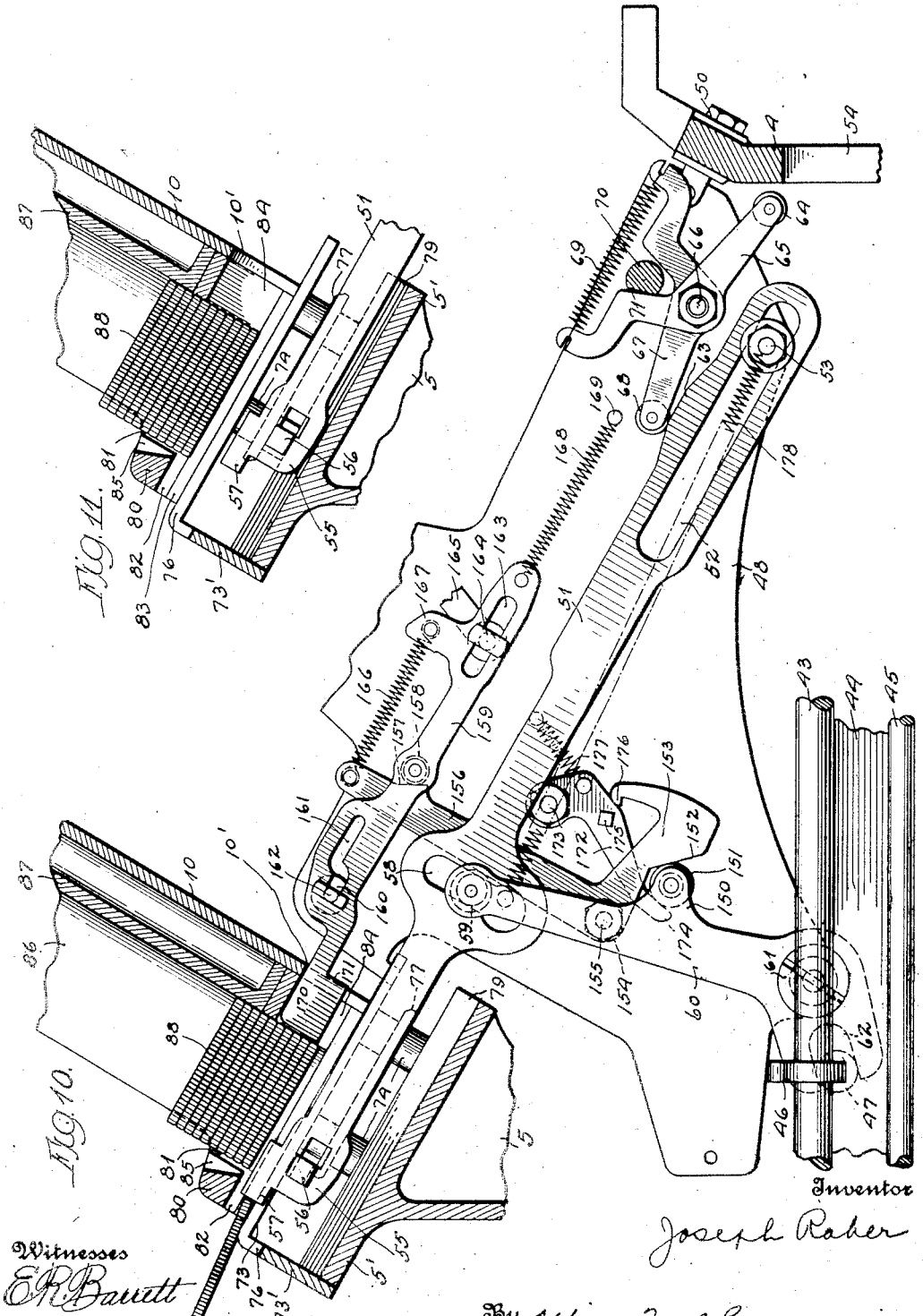

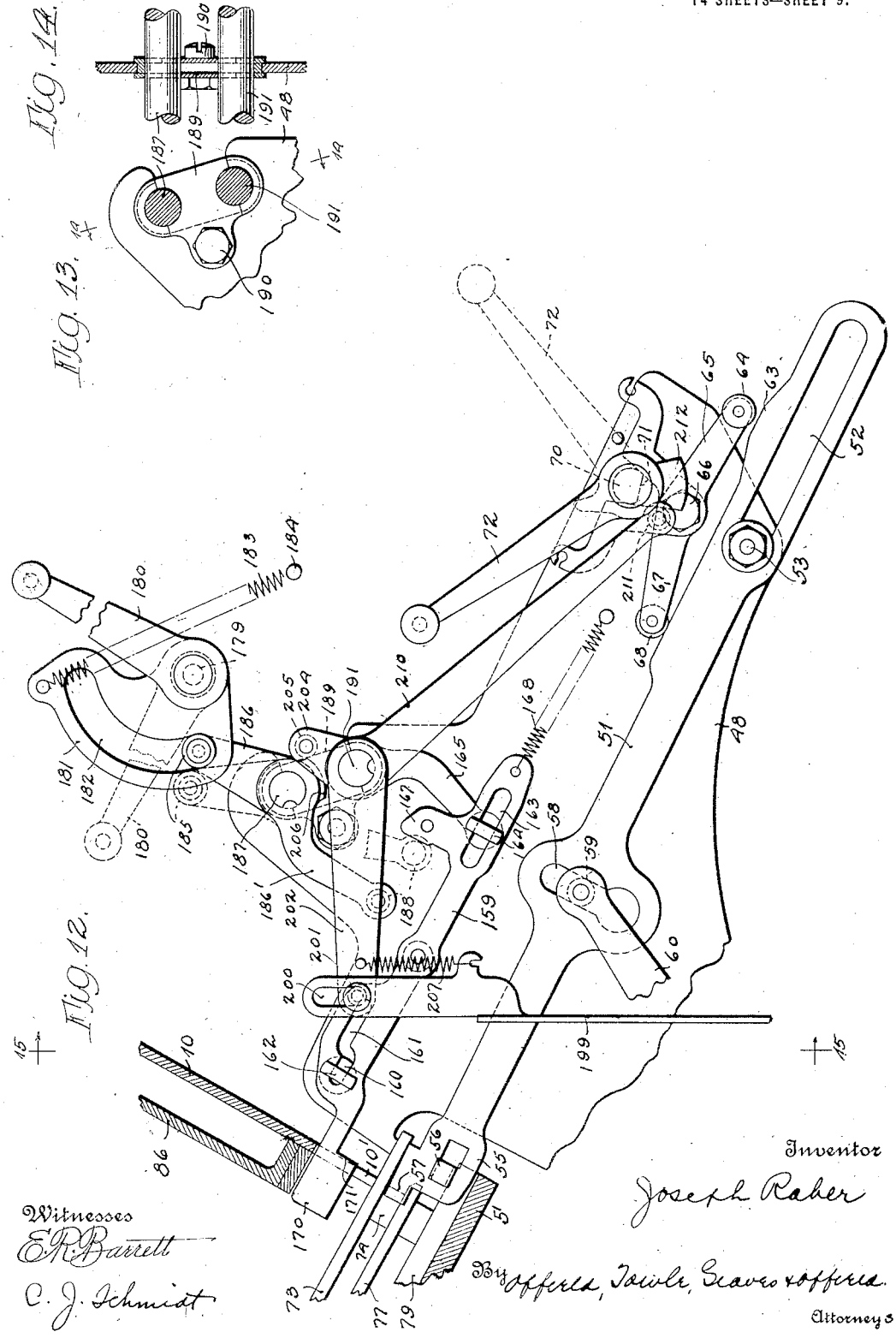

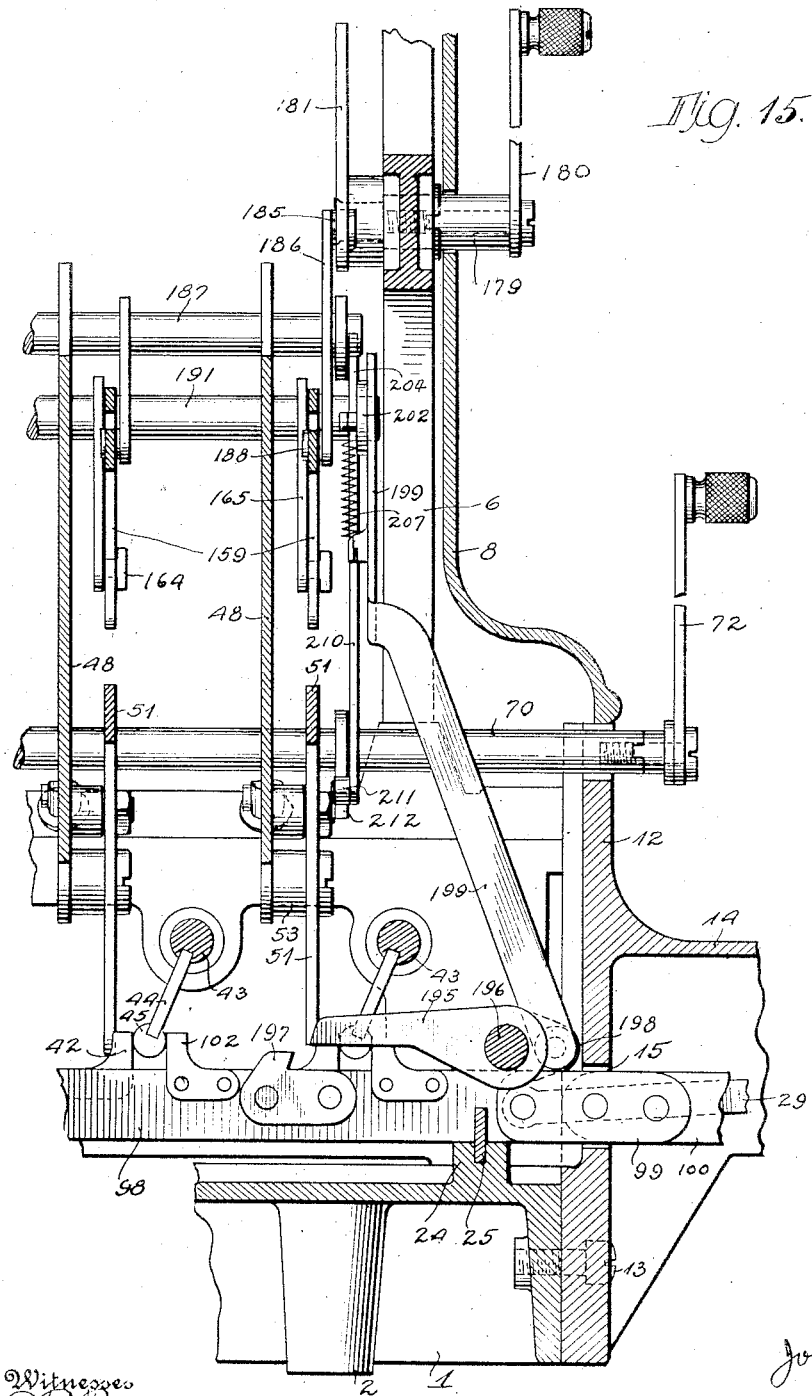

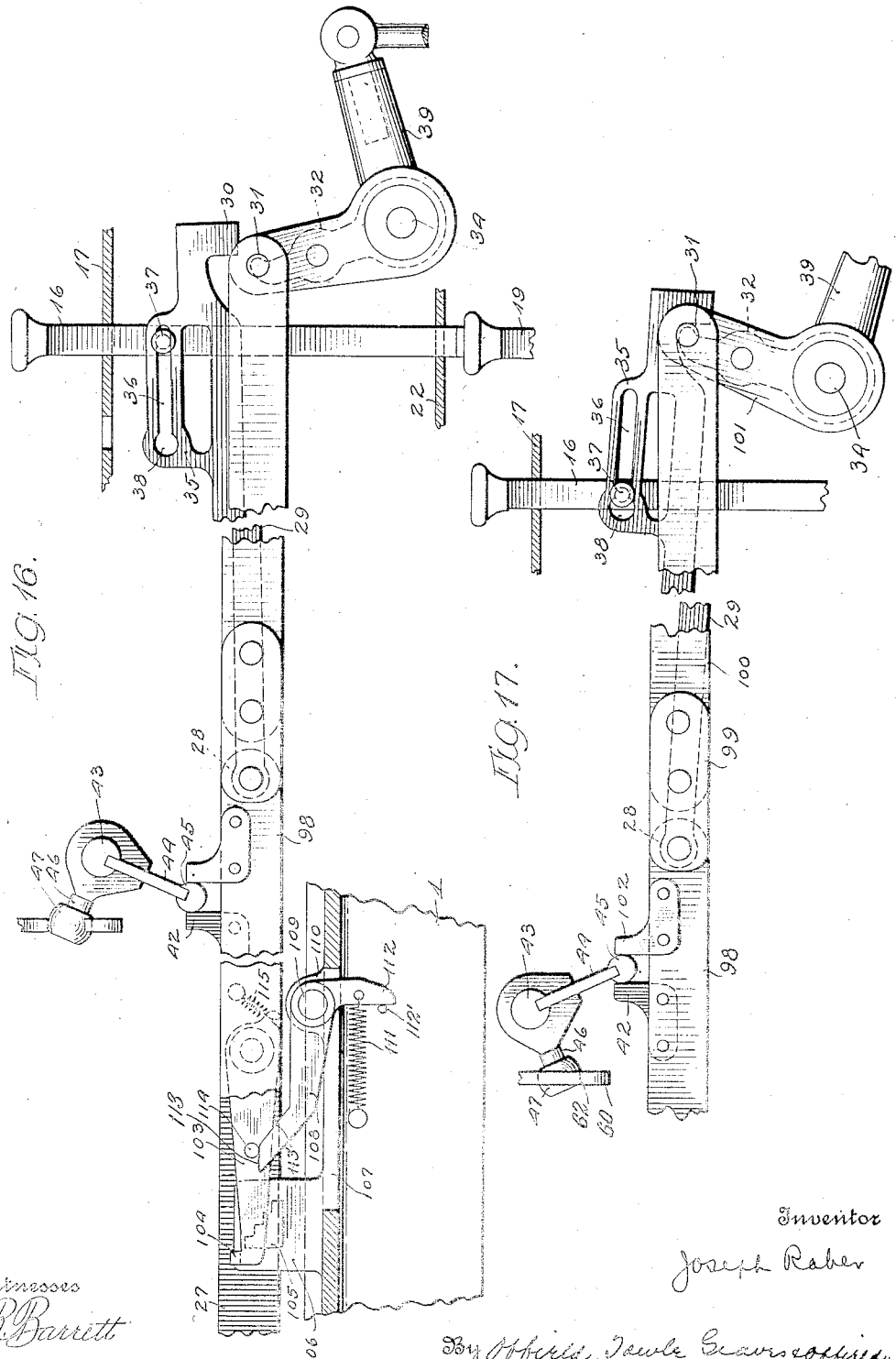

J. RABER.
PAYING AND RECORDING MACHINE.
APPLICATION FILED NOV. 17, 1914.
1,217,498.
Patented Feb. 27, 1917.
14 SHEETS—SHEET 12.
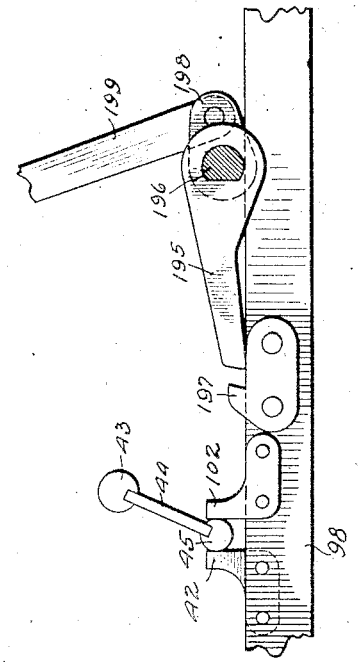
Fig. 19.
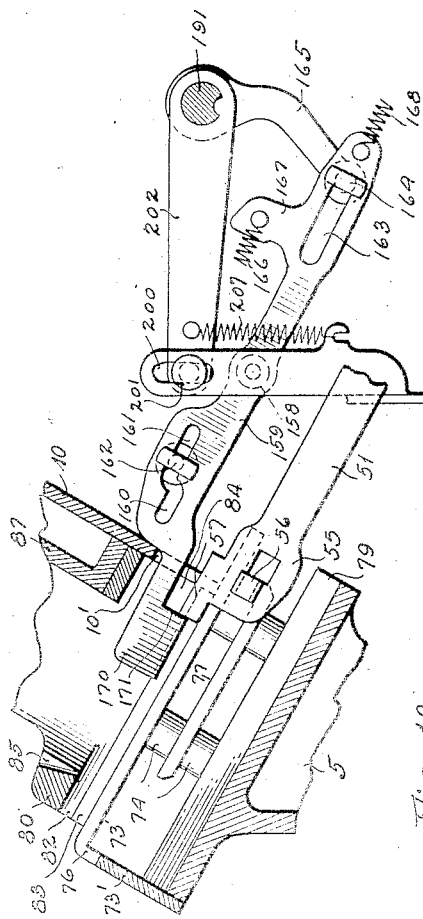
Fig. 18.
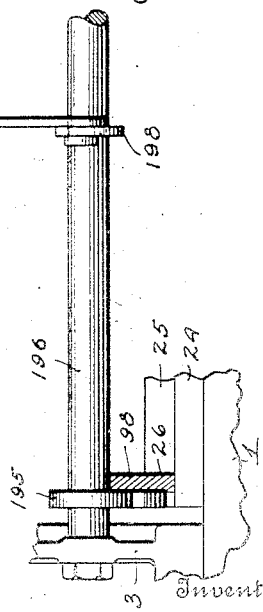
Witnesses
O. R. Barrett
C. J. Schmidt
Inventor
Joseph Raber
By Offield, Towle, Graves & Offield
Attorneys

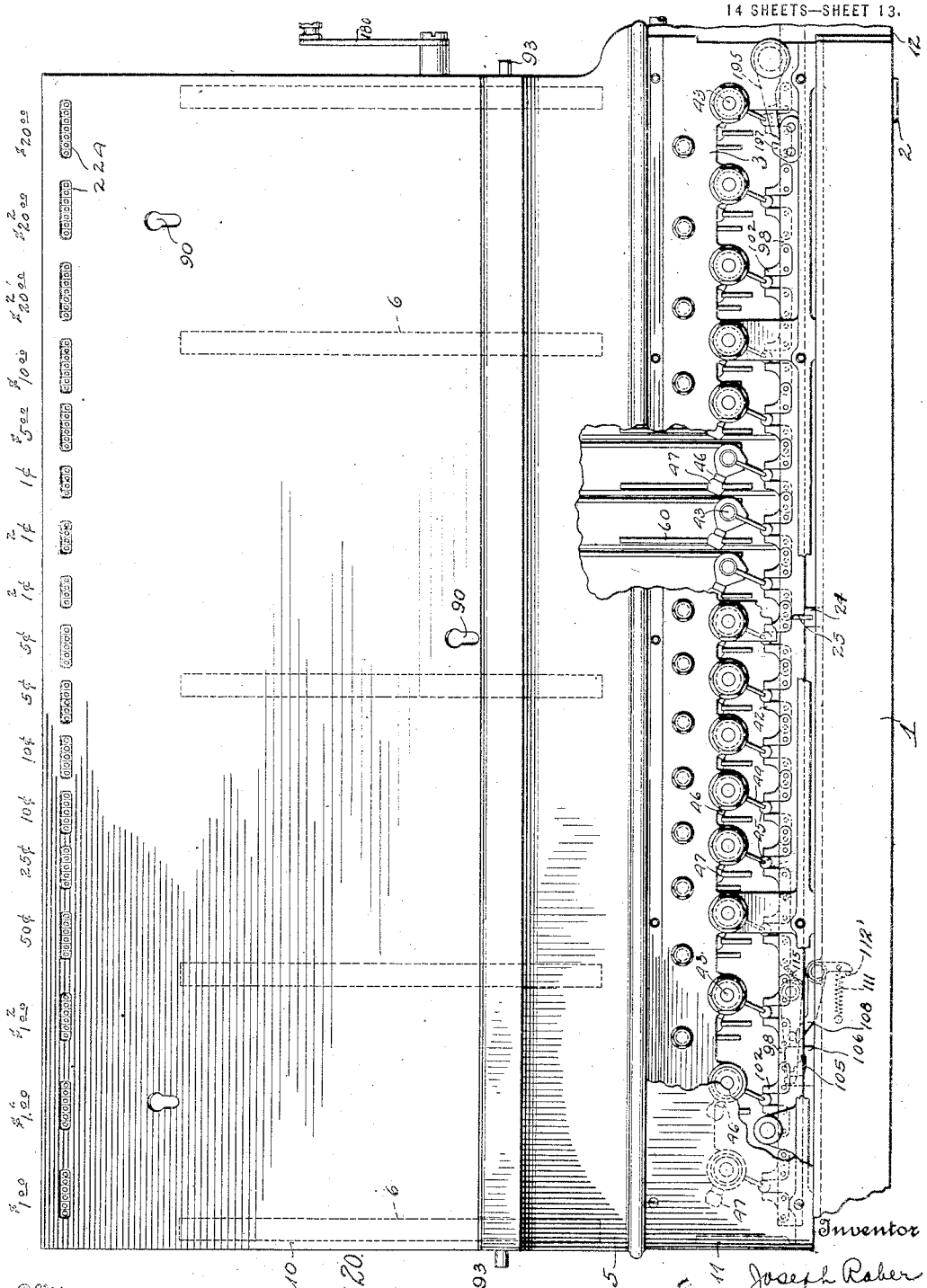

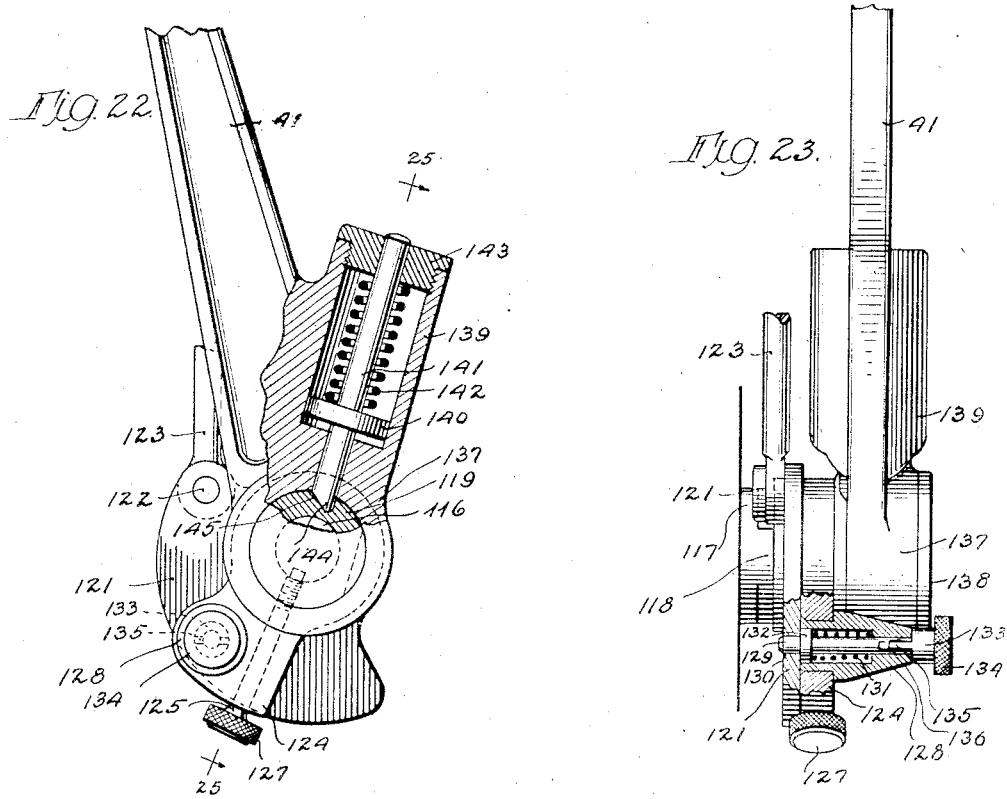

UNITED STATES PATENT OFFICE.

JOSEPH RABER, OF DETROIT, MICHIGAN, ASSIGNOR TO PAYOGRAPH COMPANY, OF DETROIT, MICHIGAN, A CORPORATION OF MICHIGAN.

PAYING AND RECORDING MACHINE.

1,217,498.   Specification of Letters Patent.   Patented Feb. 27, 1917.

Application filed November 17, 1914. Serial No. 872,589.

*To all whom it may concern:*

Be it known that I, JOSEPH RABER, a citizen of the United States, and a resident of Detroit, in the county of Wayne and State of Michigan, have invented certain new and useful Improvements in Paying and Recording Machines, of which the following is a specification.

My invention relates to paying and recording machines, particularly to that class comprising coin holding mechanism and key-board mechanism together with coöperating mechanisms whereby operation of the one will result in coöperation of the other.

In the preparation or making up of pay-rolls of large companies or corporations considerable time and labor is required in placing the required amount of money in each pay envelop, ascertaining the number of coins of certain denomination necessary to complete the pay, and balancing the amount paid out with the total ascertained for pay-roll purposes. In general, the object of the invention is to provide improved mechanism to reduce to a minimum the handling of coins, which will insure accuracy in each instance, which will insure precision, and expedite all calculations in connection with pay-rolls. More in detail, one of the main objects is to provide an improved machine which will register the numbers of coins of certain denominations required for a pay-roll to thereby permit the pay master to immediately order or procure the proper amount and proper number of coins from a bank for accurately completing a pay-roll.

Another object is to provide an improved machine for dispensing money in prescribed amounts, for maintaining record of the amount removed therefrom, for maintaining individual record of the amount in each pay envelop, for giving a total record of the entire pay-roll and a machine which will permit the amount paid out by the machine to be balanced with the amount received and placed in the machine.

Another object is to provide means for automatically locking the machine under certain conditions to prevent incomplete or wrongful setting, manipulation, or actuation of certain mechanisms to maintain such locking conditions until proper and complete setting or operation has resulted.

Another object is to produce an improved machine in which any well known adding or accounting machine of the listing type may be applied to a coin controlling structure, and to provide simple detachable means by means of which such machines when thus applied one to the other may be connected for coöperation or to be disconnected in order that the adding machine may be used independently of the coin controlling structure.

Another object is to provide construction and arrangement requiring a minimum number of simple and substantial parts which will require the least amount of effort for their control and operation, and to provide such general arrangement that the parts may be readily accessible or removed for inspection and repairs.

The above and other features of the invention will be readily understood from the following specification together with the accompanying drawings.

In the drawings—

Fig. 4 is a diagrammatic plan of the selector mechanism and a portion of the key-board looking from plane 4—4, Fig. 3;

Fig. 5 is a plan of the keyboard of the machine, partly broken away;

Fig. 6 is a front elevation of the same partly broken away and partly in section;

Fig. 7 is an enlarged horizontal sectional view substantially on plane 7—7, Fig. 3, of a portion of the magazine;

Fig. 8 is an enlarged front elevation of a lower portion of the magazine partly broken away and partly in section;

Fig. 9 is a perspective view of a portion of the base of the magazine;

Fig. 10 is an enlarged vertical cross sectional view of a portion of the magazine and ejector mechanism associated therewith showing such mechanism in the act of ejecting a coin;

Fig. 11 is a similar view of the magazine and outer end of the ejector bar illustrating the return of the ejector bar after an ejection operation;

Fig. 12 is a side elevation of the end supporting plate with ejector mechanism and locking and controlling mechanisms mounted thereon, and showing the ejector bar locked in its lower non-ejecting position;

Fig. 13 is a side elevation of a bearing plate and part of supporting framework therefor;

Fig. 14 is a sectional view on plane 14—14, Fig. 13;

Fig. 15 is a sectional view taken substantially on plane 15—15, Fig. 12;

Fig. 16 is an enlarged side elevation of a portion of the selector mechanism, restoring bar and full stroke device, showing the selector mechanism in its normal position;

Fig. 17 is a side elevational view showing a portion of such selector mechanism in an actuated position;

Fig. 18 is a vertical sectional view of a portion of the coin magazine, and showing the end of a coin ejector and automatic locking mechanism associated therewith;

Fig. 19 is a portion of the selector mechanism illustrating a locking device for the restoring bar;

Fig. 20 is a front elevation of the coin dispensing part of the machine with the magazine removed and other parts broken away and partly in section;

Fig. 21 is a side elevation of the detached magazine, partly broken away;

Fig. 22 is an enlarged elevation of a portion of the operating lever of the adding machine, partly broken away and partly in section;

Fig. 23 is a front elevation of the same partly broken away;

Fig. 24 is a side elevation of the protruding end of the main shaft of the adding machine, and Fig. 25 is a longitudinal sectional view on plane 25—25, Fig. 22.

Figure 1:
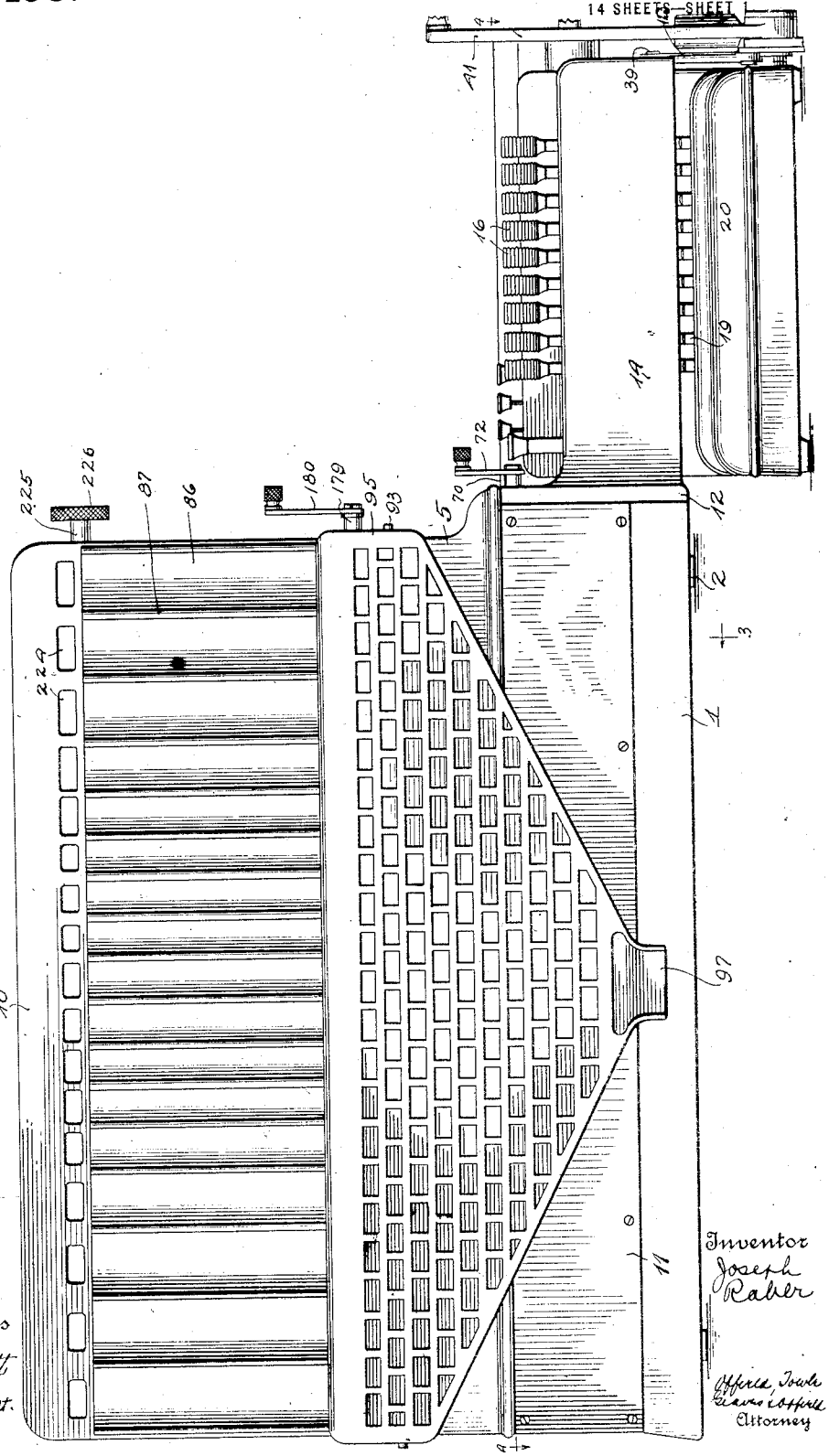
Figure 1 is a front elevation of the machine in connection with the adding machine.

The supporting framework for the various mechanisms of the machine is clearly shown in Figs. 1 to 6, 15 and 20. It comprises a base or platform 1 having legs 2, and on this base are mounted front and rear skeleton supporting walls 3 and 4, the base 5 of a coin magazine extending along and being supported on the front wall 3. Resting on this base 5 and on the rear wall 4 vertical A-frames 6 are disposed at intervals for supporting the various mechanisms and movements for controlling coin ejection and other operations to be described in detail later. These A-frames are inclosed by a casing comprising a rear wall 7, end walls 8 and 9, and a front plate 10, the casing being detachable in order that access may be readily had to the interior of the machine. Extending upwardly from the main base or platform 1 is the inclosing shell or band 11 which closes the front, rear and left end space between this base and the lower edges of the walls 7 and 9 and the coin magazine base 5. As best shown in Figs. 1 and 15, the space between the base 1 and the wall 8 is closed by a plate 12 detachably secured to the base 1 as by screws 13, this plate supporting a key-board casing or housing 14. Just above the base 1 the plate or wall 12 has the horizontally extending slot 15 through which extend various members to be controlled by the keys 16 mounted on the key-board 17 supported on the housing 14.

Figure 2:
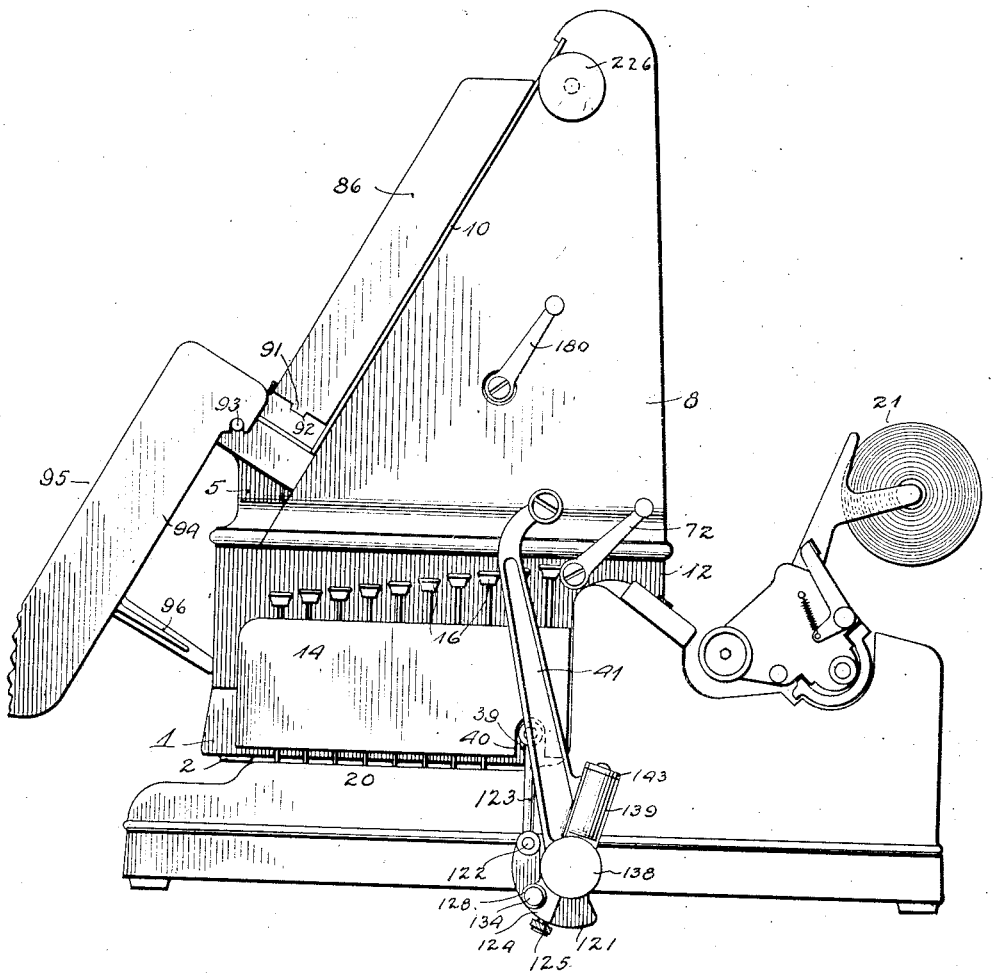
Fig. 2 is a side elevation of the same partly broken away.

As best shown in Figs. 1 and 2, the coin supporting part of the machine is, when in service, raised sufficiently so that an adding machine 18 may be placed below the housing 14 in such position that the keys 16 will register with the adding machine keys 19. The adding machine requires no special construction to be so associated with the coin dispensing device but may be an ordinary adding machine comprising a key-board 20, and printing or tabulating equipment 21 in addition to the keys 19. When any of the keys 16 is depressed the corresponding adding machine key will also be depressed and the connected adding machine parts will be actuated in the usual manner just as though the adding machine keys were depressed during ordinary use of the machine. The keys 16 of the paying machine, like the adding machine, are arranged in rows, nine deep. Of the four rows at the right designated A, Figs. 5 and 6, the first row represents from one cent to nine cents; the second row from ten cents to ninety cents by tens; the third row from one dollar to nine dollars; the fourth row from ten dollars to ninety dollars. The remaining rows, designated B, at the left are employed for selectively effecting identification, printing and tabulating, as for example identifying workmen, jobs, etc. The keys 16 extend through and are guided by the top plate or board 17 and the lower plate 22, this lower plate being supported by cross bars 23 extending transversely across the housing 18 as clearly shown in Figs. 5 and 6.

The selector mechanism for coin ejection is best shown in Figs. 2 to 6, 15, 16 and 17. Bars 24 extend at intervals transversely across the supporting base 1, each bar being slotted to receive a comb shaped guide plate 25, the slots 26 in these plates being in alinement for receiving the lower edges of the selector bars 27. The right ends of these bars terminate just inside of the slot 15 in the supporting wall 12 of the key-board housing 14 and are there pivoted as indicated at 28 to latch bars 29 arranged within the housing 14 above the cross supports 23, one of these bars being associated with each of the keys of the group A. As shown, the outer end of each latch bar has a hook extension 30 which is brought upon depression of the bar in front of a transverse bail 31 carried by the web 32 extending upwardly from shaft 34 journaled in the front and rear walls of the housing 18. Each latch bar has an upwardly extending web 35 provided with a longitudinal slot 36 to receive the stud or pin 37 extending from the key with which the bar is associated, the slot having at its one end the enlargement 38 for facilitating assembling. The keys are normally held upwardly and upon depression of any key the corresponding latch bar is depressed to carry its end 30 in front of the bail. The shaft 34 has a crank arm 39 extending therefrom through the slot 40 cut in the outer end wall of the housing 18, as clearly shown in Fig. 2, and this arm is connected to be swung upon actuation of the operating lever 41 of the adding machine. When the arm 39 is swung and the shaft 34 rotated in clockwise direction any latch bar and the selector bar 27 connected therewith will be shifted toward the right. Each of the selector bars is provided with one or more actuating lugs 42 which are secured to the upper side of the bar and properly spaced, the number and the spacing of the lugs depending upon the key with which the bar is associated, as will hereinafter appear.

Arranged transversely of the machine above the selector bars and journaled in the front and rear walls 3 and 4 are shafts 43 (Figs. 3 and 4), these shafts corresponding in number to the coin magazine compartments. Extending from each shaft is a web 44 carrying at its lower end a cylindrical abutment rod 45 to be engaged by the abutments 42 upon shifting of the associated selector bar (Figs. 16 and 17). At the front end each shaft 43 has a crank arm 46 pivoting a roller 47, these rollers engaging with actuating levers for coin ejecting mechanisms.

The coin ejector and actuating mechanism therefor is best shown in Figs. 3, 10, 11, 12, and 18. An ejector mechanism outfit is associated with each coin compartment, the mechanisms being mounted on plates 48 extending transversely of the machine and detachably secured to the front and rear walls 3 and 4 as indicated at 49 and 50. Each mechanism comprises an ejector bar 51 having the longitudinal slot 52 in the rear end thereof which receives a pivot post 53 extending from the supporting plate 48. To provide clearance for the ejector bars the rear wall 4 is slotted as indicated at 54, Fig. 10. The front end of the ejector bar has the enlargement 55 and supports a transverse guide pin 56, and a coin engaging finger 57 projects forwardly from the upper end of the enlargement. Intermediate its ends each ejector bar is enlarged and has the transverse slot 58 for receiving a roller 59 extending laterally from the upper end of a bell crank lever 60 pivoted at its elbow on a stud 61 extending from plate 48 and having its other arm slotted as indicated at 62 for receiving the roller 47 carried by the adjacent rock shaft 43 which is swung upon shifting of the selector bar with which this shaft is associated. Thus upon depression of any key and swinging of the main operating lever 41 the corresponding selector bar will be shifted outwardly and the rock shaft 43 associated therewith will be swung to effect swing of the bell crank lever 60 and forward shifting of the ejector bar, and when the conditions are normal such forward shift will result in ejection of a coin or coins from the associated coin magazine.

Figure 3:
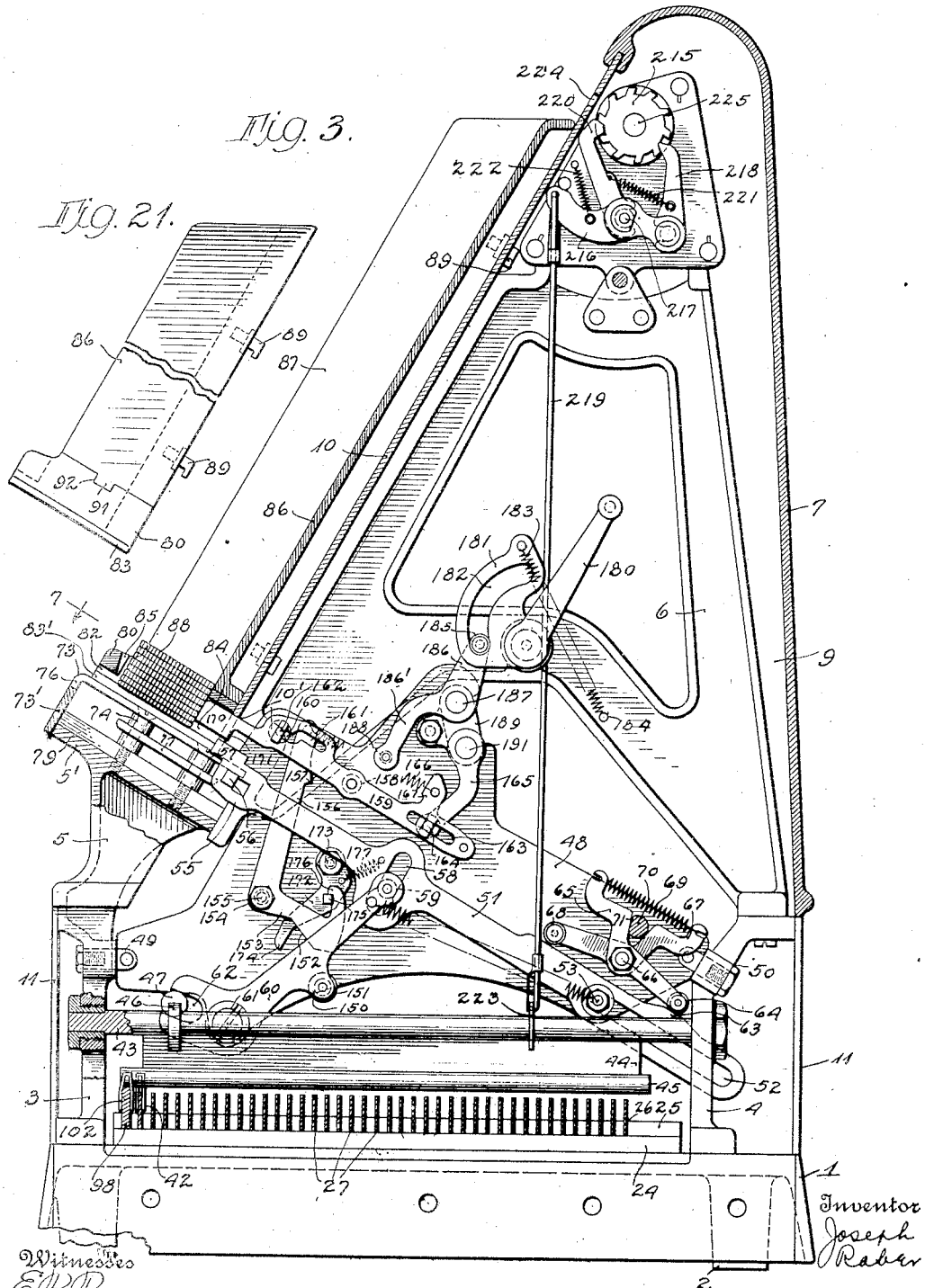
Fig. 3 is an enlarged vertical sectional view of the machine on plane 3—3, Fig. 1.

Each ejector bar has at its rear end a cam ridge 63 adapted to be engaged by a roller 64 carried on the rearwardly extending arm of a bell crank lever 65 pivoted on a stud 66 extending laterally from the supporting plate 48. Another bell crank lever 67 has its forwardly extending arm terminating in a roller 68 to be engaged by the cam ridge when the ejector bar is shifted forwardly. The rollers 64 and 68 are at opposite sides of the stud 53 and the upwardly extending arms of the bell crank levers are connected by a retractile spring 69 whereby the tendency is to swing the lower arms of the levers downwardly into the path of the cam ridge, the lever 65 by the engagement of its roller 64 with the cam ridge 63 when the ejector bar is in its rear position tending to depress the rear end of the ejector bar to raise its front end, and the lever 67 by the coöperation of its lever 68 with the cam ridge when the ejector bar is forward tending to swing the front end of the bar downwardly. The swing of the bell crank levers is controlled by a rock or cam shaft 70 journaled in the various supporting plates 48 and having a flat side 71 adjacent the upper arm of each lever 65. The right end of the shaft projects through and beyond the wall 12 and an operating lever 72 is detachably secured thereto (Fig. 15). Under normal conditions, that is, when it is desired to eject coins, the lever is adjusted to bring the flat side of shaft 71 adjacent the bell crank levers 65 in order that these levers can swing sufficiently to carry their rollers 64 into the path of the ejector bar cam ridges 63 (Figs. 3 and 10). However, when it is desired to prevent ejection of coins upon forward shift of the ejector bars, the lever 72 is swung to rotate shaft 70 to bring its flat side to the bell crank levers 67 (see full lines Fig. 12) the result being that the levers 65 are swung to carry their rollers 64 a distance upwardly to prevent engagement thereof with the cam ridges 63 and thus to prevent reëlevation of the front ends of the ejector bars after the bars are depressed by engagement with the rollers on levers 67.

Describing now the coin magazine, reference is had to Figs. 1, 2, 3, 7, 8, 9, 10, 11, 14 and 17. Secured over the top plate 5' of base 5 is a plate 73, this plate being parallel with and spaced from the top 5' by spacer blocks 74, screws 75 passing through the plate 73 and these blocks threading into the top 5'. The front end 73' of the plate 73 deflects downwardly and abuts against the front edge of the top 5'. The plate 73 has a transverse slot 76 in the path of each ejector bar and above and in registration with each of these slots the front housing panel or plate 10 has a notch 10'. The spacer blocks 74 consist of upper and lower sections and between the slots 76 these halves clamp between them guide plates 77, the adjacent plates being separated to leave passageways 78 for the front ends of the ejector bars. Adjacent guide plates serve as supporting guides for the pin 56 on the respective ejector bar and the widths of the plates are such that when the ejector bars are in their rearmost position the pins 56 will clear the rear edges of the plates to allow swing of the ejector bars, and that when the ejector bars are in their foremost position the pins will clear the front edges of the plates to allow swing of the ejector bars. In Fig. 3 the ejector bar is shown in its normal position, the front end being elevated by engagement of the cam roller 64 with the cam ridge 63. When the key is depressed which will result in forward shift of this ejector bar the pin 56 will engage on top of adjacent guide plates 77 and the bar cannot swing until the pin clears the front edges of the plates, the front roller 68 then engaging with the cam ridge and depressing the bar so that upon return movement the pin will pass and be locked below the plates until it again clears the rear edges of the plates whereupon the bar will be again raised by coöperation of the roller 63 with its cam levers. To accommodate the ejector bars during the rearward movement thereof when depressed, the top 5' is provided with slots 79. During such movement the ejecting finger 57 of the ejector bar will engage with a coin or coins to effect ejection thereof from the associated coin chute receptacle. A coin receiving block 80 is secured on top of the plate 73 and has a coin pocket 81 in front of each coin ejector. The block in front of each pocket has a horizontal slot-way 82 formed above the floor plates 83 secured to the block, the coins being ejected through these slots and adjacent floor plates are separated to leave transverse slots 83' which register with the slots 76 in plate 73, and at the rear each block has a vertical slot 84 in register with the slots 76 and 83'. Thus when an ejector bar is shifted forwardly when in raised position its front end will pass through these registering slots and its finger 57 will encounter the coin at the bottom of the pocket and will eject this coin through and from the horizontal slot 82. At the end of the forward stroke of an ejector bar the bar is depressed as has been described and is held down by the plates 77. The ejector bars are then relieved of the weight of the coins and can be restored more freely and with much less effort. Each pocket at its front end may be notched as indicated at 85 for permitting withdrawal of a coin by a suitable tool.

Resting on top of block 80 and against the panel 10 is the magazine structure 86 which has vertical partitions 87 dividing it into coin holders or compartments adapted to receive the coins 88. The back of the magazine structure has pins 89 for engaging in slots 90 provided therein in the front wall or panel 10 of the inclosing casing. In order to more securely hold the magazine in position it has depending tongues 91 engaging in grooves 92 cut in block 80 between the various coin pockets therein. Extending from the sides of the coin magazine structure are pins 93 and hung on said pins are the notched end walls 94 of a chute 95 (Fig. 2). The chute is supported in an inclined position by a leg 96 engaging the front of the machine and the floor halves deflect downwardly to the coin delivery outlet 97 to which the ejected coins pass to be received in an envelop or in any other suitable receptacle.

Upon forward pull on the main operating lever 41 of the adding machine the various selector bars are shifted outwardly and through the abutments, rock levers, and bell crank levers the selected ejector bars are shifted forwardly. All this mechanism must then be restored to normal and for this purpose restoring mechanism is provided which is actuated upon rearward swing of the main operating lever 41. Referring to Figs. 3 to 6 and 14 to 17, a restoring bar 98 is disposed in front of the selector bars and slidable in slots provided in the plates 25. This restoring bar is connected by a link 99 with connecting bar 100 which is pivoted to the crank arm 101 at the end of the rock shaft 34 in order that the lock bar may be drawn forwardly simultaneously with the outward shifting of selector bars by engagement of the bail 31 with the depressed latch bars 29. The restoring bar carries an abutment lug 102 adjacent each bar 45 and when the main operating lever is restored after an ejecting operation thereof, the restoring bar is shifted inwardly and the shafts 43, levers 60 and actuated ejector bars connected therewith will be restored to normal position and likewise set up selector bars 27 will be shifted back to normal and as soon as the latch bars 29 are released from the bail 31 they, together with their keys, will be raised to normal by force of the springs associated with the keys of the adding machine.

In order to get accurate and certain results, provision is made to insure full stroke of the main operating lever 41. Mechanism for accomplishing this is shown in Figs. 16 and 20. Pivoted at its right end to the side of the restoring bar 98 is a detent lever or pawl 103 and has at its other end a laterally extending tooth 104 for coöperating with a stepped latch plate 105 secured to the projection 106 on base 1. Adjacent the projection 106 the top of base 1 has the longitudinal slot 107 to provide clearance for an L-shaped cam lever 108 pivoted on pin 109 journaled in the lugs 110 adjacent the slot 107. A spring 111 acting on projection 112 of lever 108 tends to hold said projection against a pin 112′ and the lever 108 in horizontal position with its end 113 and slanting surface 113′ in the path of a pin 114 extending laterally from lever 103. A spring 115 tends to swing lever 103 downwardly, but the spring 111 is stronger than spring 115. Normally (Fig. 16) the detent tooth 104 is to the left of the step latch plate 105 and the pin 114 rests on the end 113 of lever 108. Now when the main actuating lever is drawn forwardly to effect ejection operation the restoring bar 98 and lever 103 will travel therewith, and detent tooth 104 will pass over the upper step surface of the latch plate 105 as soon as pin 114 leaves the end 113 of lever 108. After pin 114 leaves the end 113 spring 115 will no longer be restrained by the force of spring 111 and lever 103 will gradually drop until its tooth 104 leaves the last step of the latch plate, the tooth 104 being then below the lower edge of the latch plate. As the main actuating lever is restored and the restoring bar shifted back toward normal position, detent tooth 104 travels along below the latch plate until pin 114 reaches the surface 113′ of lever 108 and this lever is cammed downwardly and by force of spring 111 tends to force the lever 103 upwardly, but this is prevented until tooth 104 has passed the entire distance under the latch plate 105 to the left thereof, the tooth being then clear of the plate so that lever 103 can be swung back to normal position by the lever 108 with the detent tooth 104 above the top step of the plate but to the left thereof. With the mechanism described it is impossible to restore the main actuating lever after only a partial forward operation thereof, for any restoring operation will be prevented by engagement of tooth 104 with one of the steps of the latch plate 105 until the main actuating lever has been fully operated and tooth 104 released from the lowermost step of the latch plate. Correct and efficient ejection is therefore assured.

The construction and arrangement of the main operating lever is clearly shown in Figs. 22 to 25. This lever is loosely and detachably mounted on the outer end 116 of the main operating shaft of the adding machine, the shaft having a collar 117 from which extend clutch teeth 118. The hub 119 has notches 120 for receiving the clutch teeth 118 when the hub is applied to the shaft 116. Loosely journaled on the hub at the inner end thereof is a segment 121 having a pin 122 which is connected by a rod 123 with the end of crank lever 39 extending from the bail shaft 34 of the paying mechanism. Adjacent this segment the hub journals an auxiliary segment 124 through which extends a locking pin 125 which passes through the hub to engage in a peripheral groove 126 on shaft 116 to lock the hub to the shaft and to lock the auxiliary segment to the hub. The outer end of the pin has a knurled head 127 and its inner end has threads for engaging in the hub opening to prevent the pin from dropping out. To lock the auxiliary segments in respect to the segment 121, a barrel or lug 128 extends from segment 124 and accommodates a locking pin 129 for engaging in hole 130 provided in segment 121. A spring 131 interposed between the base of the barrel and the collar 132 on the pin tends to force the pin outwardly to hold its end in the hole 130. A head 133 for the pin has a knurled flange 134 and oppositely disposed ribs 135 on the head engage normally in slots 136 in the end of the barrel. When the pin is pulled outwardly and partially rotated these ribs will abut against the outer end of the barrel and will withhold the pin from the hole 130.

The operating lever 41 extends from a collar 137 mounted on the outer end of the hub 119 and held in place thereon by a cap 138 having detachable engagement with the hub. Extending radially from this collar is a barrel 139 in which is slidable the head 140 on the plunger 141. A spring 142 encircles the plunger between the head 140 and the detachable plug 143 in the barrel end and tends to force the plunger downwardly. The lower end of the plunger passes through the collar 137 and has a beveled end or tooth 144 for engaging in a notch or groove 145 cut in the collar 137. The plunger 141 allows a lever 41 to recede over the hub 119 in one direction, i. e., return movement, but locks the lever relative to the hub in the opposite direction, i. e., operating stroke. When it is desired to use the adding machine alone by withdrawing locking pin 129 to unlock the segment 121 from the lever the adding machine can be operated without effecting operation of the paying mechanism.

It may happen that one of the coin chutes becomes empty unbeknown to the operator, in which case any set-up amount which would require ejection from the empty compartment will result in shortage in the coins delivered. I therefore provide means for automatically locking the machine against ejection in such cases, such locking warning the operator who must then place coins in the empty compartment before he can proceed. Such locking mechanism is best shown in Figs. 3, 10, 12, 18 and 19. Each of the ejector bar actuating levers 60 has a bearing extension 150 for a roller 151 which serves two purposes. First, the roller engages a cam surface 152 on the lower arm 153 of the bell crank lever 154 pivoted at 155 to the supporting plate 48. The arm 156 of the lever extends upwardly and near its upper end has a cam extension 157 for engaging a roller 158 carried on the side of the locking plate 159. This locking plate is above the ejector bar and substantially parallel therewith and near its front end is enlarged and has the front longitudinal slot section 160 and the rear slot section 161, these slot sections being connected with each other but offset vertically, the section 160 being below the section 161. The slot sections are adapted to receive a headed pin 162 extending forwardly from the supporting plate 48, this pin engaging normally in the lower slot section 160. At its rear end the locking plate has the longitudinal slot 163 for receiving a headed pin 164 extending from a lever 165. The two pins just referred to support the locking plate. A spring 166 connects between the upper end of lever arm 156 and the up-standing lug 167 on the locking plate, a spring 168 being also provided between the locking plate and the pin 169 extending from the supporting plate 48. At the front end of the locking plate the head 170 has a depending locking shoulder 171. As best shown in Fig. 3 the spring 166 tends to normally hold the locking plate forwardly to project its head 170 through the slot 84 of the associated coin magazine base and against the coins therein, the lower slot section 160 receiving the pin 162 to hold the locking shoulder 171 of the plate above the path of the ejecting finger 57 of the ejector bar.

Provision is made to withdraw the locking plate a distance from the coins just after ejection of the lowermost coin in order that the remaining coins will drop to the bottom of the chute ready for the next ejection. The mechanism for accomplishing this comprises a detent lever 172 pivoted on pin 173 extending from plate 48, the end 174 of the lever being in front of the roller 151 on the ejector bar actuating lever 150. A pin 175 extends laterally from the lever to normally engage under the detent end 176 on arm 153, a spring 177 tending to maintain such latching engagement as illustrated in Fig. 3.

During such latching engagement the arm 156 is swung forwardly to hold its cam extension 157 away from roller 158 on the locking plate and the spring 166 is then stretched and overcomes the force of spring 168 and will cause the locking bar to press against the coins. When the lever 150 is swung to project the ejector bar, the roller 151 will eventually engage with the end 174 of the latch lever and this latch lever being swung upwardly will draw its latch pin from the latch end 176 and lever 156 will be released to impinge against the roller 158 with its cam extension 157, and such impingement, together with shortening and weakening of spring 166 and the effort of spring 168, will shift the locking plate rearwardly a distance to withdraw its head from the coins, and this happens just as the coin is being ejected into the chute, as illustrated in Fig. 10, and the remaining coins in the magazine are free to drop to the bottom of the coin pocket. When the parts are restored the roller 157 releases the latch lever and by operating against the cam surface 152 of arm 153 the arm 156 is swung back to normal position to release the roller 156 on the locking plate and to stretch spring 166 in order that this spring will again overcome spring 168 to draw the locking plate forwardly into abutment against the coins. The spring 178 connecting between actuating lever 150 and the pin 53 tends to hold the actuating lever in normal position.

The head 170 of the locking bar abuts against the upper part of the lowermost coin in the magazine to leave sufficient abutment surface for the ejector finger and therefore as long as there is any coin in the magazine the locking plate is prevented from entering the magazine. However, as soon as the last coin has been ejected and the ejecting bar has been restored and the arm 156 has again been latched and spring 166 again rendered effective, the locking plate will be thrown forwardly to carry its head into the magazine and to bring the upper slot section 161 into engagement with the pin 162, the result being that the locking plate drops to carry its detent shoulder 171 into the path of the ejecting finger 57 of the ejector bar and if the same ejector bar is then set up and ejection attempted by swinging forwardly the main operating lever such ejection will be blocked as soon as the ejecting finger meets the detent shoulder 171 and further pull on the main operating lever will shift the ejector bar forwardly together with the locking plate until the rear end of slot 163 in the locking plate meets the pin 164 already referred to (see Fig. 18). Such blocking of further movement of the main operating lever is a warning to the operator that one of the magazines is empty and before the machine can be used further such empty magazine must be refilled.

For re-setting the latch bars to unlock the ejector bars manually controllable mechanism is provided and this is shown best in Figs. 3, 12, 13 and 15. Journaled in the right end A-frame 6 is a rock shaft 179 having its outer end extending through the housing end wall 8 and there provided with a detachable lever 180. The inner end of the shaft carries a sector 181 having the slot 182 eccentric with respect to the shaft 179, a spring 183 extending between the sector and a pin 184 tending to rotate the segment and shaft to swing the lever 180 toward the rear of the machine. Playing in the slot 182 is a roller 185 mounted on the arm 186 which is secured to the rock shaft 187. Associated with each locking plate is an arm 186' which carries a roller 188 for engaging with the abutment 166 of the associated locking plate when the shaft 187 is rotated. When lever 180 is swung forwardly the eccentric slot 182 acting on the roller 185 on arm 186 will cause rotation of shaft 187 and rearward swing of the various arms 186' to carry their rollers 188 against the forwardly shifted locking plates to restore said plates to their normal position.

As shown best in Figs. 13 and 14, the shaft 187 is journaled at the upper ends of bearing plates 189 supported on the various supporting plates 48, these bearing plates being detachably held in place as by bolts 190. The lower ends of the bearing plates journal the shaft 191 parallel with the shaft 187, and this shaft 191 has for each locking plate one of the crank levers 165 already referred to, these levers each supporting a pin 164 which engages in the slot 163 of the respective latch plate.

At times it is necessary to lock the machine against certain operations as for example segregation operation when totalizer mechanism, to be described later, is to be actuated independently of the ejector mechanism to ascertain the numbers of coins to be placed in each magazine for paying off a pay-roll for example. At other times it is desirable to lock against certain operations in order that there may be no confusion or error in other operations. Such locking is preferably accomplished by locking of the restoring bar 98 already referred to. Referring to Figs. 12, 15, 18 and 19, a locking pawl 195 is mounted on a transversely extending shaft 196 with its end in the path of an abutment 197 secured to the restoring bar, the shaft having an oppositely extending arm 198 from which extends a link 199 having at its upper end a vertical slot 200 in which plays the pin 201 extending laterally from the end of a forwardly extending arm 202 keyed on the shaft 191. Extending upwardly from this hub is an arm 204 pivoting a cam roller 205 disposed in the path of a cam ridge 206 extending from the lever 186 on shaft 187, and a spring 207 connects between the front end of arm 202 and link 199. Normally the arm 202 is down to hold its roller against the bottom of slot 200 to depress the link 199 and to rock the shaft 196 to hold the pawl 195 above the restoring bar abutment 197 in order that this bar may be operated. However, as soon as arm 202 is raised the spring 207 is free to raise the link 199 and to throw the pawl into the path of the abutment to lock the restoring bar. Such locking is desirable when a magazine is empty and ejection is attempted. Such ejection could of course be prevented as before described by the detention of the ejector bars by the depressed locking plates. This, however, will put unnecessary strain on the ejecting controlling apparatus. However, by locking the restoring bar all such strain on the more delicate ejector parts is removed. Locking of the restoring bar under the conditions just referred to is accomplished in the following manner. When a locking plate is thrown forwardly into an empty magazine the end of its slot 163 encounters the pin 164 on lever 165, the result being that shaft 191 is rocked and arm 202 thrown upwardly to release the link 199 and to allow its spring 207 to raise it and to carry the pawl 195 into locking position with reference to the locking bar 98. If now attempt is made to eject after a magazine becomes empty, the main operating lever and locking bar will take up the strain and injury to more delicate parts will be prevented. This restoring bar locking operation is illustrated in Figs. 18 and 19.

After such locking of the machine it must be released in order that new coins can be seated in the empty magazines in order that the machine can be further operated. To effect unlocking the lever 180 is swung forwardly to effect rocking of shaft 187 and swing of levers 186' into engagement with the locking plates to raise and restore the plates to normal position. As soon as the locking plates are shifted rearwardly sufficiently to release the slots 163 from the pins 164 the levers 165 and shaft 191 will be released. Upon such release the arms 202 extending from shaft 191 will tend to drop and to move link 199 downwardly to effect release of pawl 195 from the restoring bar. However, such unlocking movement is prevented until the lever 180 has been swung back to normal position, for when shaft 187 was rotated during forward movement of this lever the cam ridge 206 was swung into the path of roller 205 on arm 204 secured to shaft 191. However, as soon as the lever 180 has been swung back to normal position the cam 206 will be disengaged from the roller 205 and shaft 191 is then freed and arm 202 may drop to effect downward movement of link 199 and raising of pawl 195 away from the restoring bar, the restoring bar being then released and the machine ready for further operation. The length of the cam ridge is such that the restoring lever 180 must be fully restored before unlocking will take place.

Reference has already been had to the lever, 72, and this lever is actuated to put the machine in condition for segregation purposes, actuation of the lever resulting in prevention of the ejector bars from ejecting coins, the bars although free to be shifted forwardly and rearwardly being held in depressed position below the floor of the coin pockets. If such lever is only part way and not fully actuated, defective and wrongful operation may result. I therefore provide means for insuring full and complete actuation of such lever. Referring particularly to Figs. 12 and 15, the downwardly depending arm or lever 210 is keyed to shaft 191 and pivots at its lower end a cam roller 211 in the path of a cam wing 212 extending from the shaft 70. As soon as the lever is swung from one operative position to its other operative position this cam 212 will engage with the roller 211 to swing the arm 210 and rotate shaft 191, this resulting in raising of arm 202 and locking of the machine restoring bar by the pawl 195. The cam is of such length that these locking conditions will be maintained until the lever has been fully actuated from one operative position to the other. If the lever is actuated and left in intermediate position the machine will remain locked. In Figs. 2 and 3 the lever is in its rear position, the shaft 70 being set with reference to the associated bell crank levers to allow raising and lowering of the ejector bars in order that ejection may be accomplished. If the lever is now swung forwardly for the purpose of setting the shaft 70 to prevent raising of the ejector bars as for segregation purposes, the cam 212 will engage the roller 211 and the machine will be locked until the lever has reached its forward position (full lines Fig. 12), the cam remaining in front of the roller until this position is reached. Again, if the lever 72 is swung rearwardly with the intention of putting the machine in condition for ejecting, the lever must be swung its full distance and to the position indicated in dotted lines Fig. 12, before the cam will release the roller to allow unlocking of the restoring bar. Proper setting of the levers and efficient operation of the mechanisms is therefore assured at all times.

Coming now to the counting mechanism which registers the ejection of coins, such mechanism is best shown in Figs. 1, 2, 3 and 20. Associated with each coin holder of the magazine is a counter which is located in the upper part of the inclosing casing 7, 8, 9 and which is mounted at the top of the associated A-frame. Such counters may comprise ordinary and well known parts and controlling mechanisms including counter wheels, actuating and detent pawl mechanism, and carry over mechanism. As shown, counter wheels 215 are provided and the controlling mechanism is shown as comprising a rock lever 216 mounted on pivot 217, the actuating pawl 218 extending from one end of the lever, and actuating rod 219 extending downwardly from the other end of the lever, and a detent pawl 220 mounted on pivot 217, a spring 221 connecting the pawls and a spring 222 tending to resist downward movement of the rod 219. Each rod connects at its lower end with an arm 223 extending from the rock shaft 43 of the corresponding ejector mechanism, the arrangement being such that when set-up selector bars are shifted outwardly and corresponding shafts 43 rocked, the rods 219 will be drawn downwardly to effect actuation of the associated counting mechanism. In front of the wheels of each counter the panel 10 has a sight opening 224, each sight opening being over the associated coin magazine. A resetting shaft 225 controllable by a knurled head 226 serves for resetting to zero of the various counters after an operation of the machine.

In order to facilitate ejection of certain amounts of money it may be desirable to eject more than one coin from a magazine pocket for each actuation of the associated ejector bar. This is accomplished by increasing the vertical width of the ejecting finger 57 and correspondingly reducing the vertical width of the head of the associated locking plate. This is illustrated in Fig. 3 where the magazine section is shown which contains twenty-dollar gold pieces, the arrangement being such that two coins will be ejected for each operation of the ejector bar. The counter associated with this magazine section will of course be so adjusted as to indicate such multiple ejection.

From the foregoing description the operation can be readily understood. If it is desired to use the adding machine alone the pin 129 is withdrawn to release the segment 121 from the main operating lever 41. If it is desired to use both machines for segregating purposes, i. e., for determining the required number of coins of prescribed denominations for meeting a pay-roll the locking pin is set to lock the segment 121 to the operating lever. The lever 72 is then swung rearwardly as indicated in dotted lines Fig. 12, to rotate the shaft 70 to withdraw its flat surface 71 from the ejector arm bell crank controlling levers, thus holding the rollers 64 above the path of the ejector bars 51 and maintaining the rollers 68 in engagement with the ejector bars to confine them to reciprocation below the coin pockets. When shifting the lever 72 the cam 212 coöperates with arm 210 to release the arm 202 which releases the link 129 to allow the locking pawl 195 to lock the restoring bar 98, such locking continuing and preventing use of the machine until the lever 72 has been swung the full distance rearwardly when the cam 212 will release the lever 210. When the segregating lever has been swung the full distance the main operating lever and the machine can be operated.

Suppose for example that the pay for employee No. 88 amounts to ninety five dollars and fifty cents ($95.50), the operator depresses the "eight" keys $a$, $b$, in the fifth and sixth rows, (Figs. 4, 5 and 6). This operation through the medium of the adding machine operating and printing mechanism 21 will record the workman's number. Next, the operator depresses the "nine" key $c$ of the fourth row, the "five" key $d$ of the third row, and the "five" key $e$ of the second row. Depression of these amount keys will effect setting up of the corresponding latch bars 29 and when the main operating lever is then swung forwardly the corresponding selector bars $c'$, $d'$ and $e'$ will be shifted outwardly. Referring to Fig. 4, the selector bar $c'$ has three actuating lugs 42, the selector bar $d'$ has one such lug, and the bar $e'$ has one lug, so that five shafts 43 will be rocked and the corresponding levers 60 swung to shift the corresponding ejector bars forwardly. The ejector bars actuated are thus respectively associated with the second, third, fourth, fifth and fourteenth coin compartments counting from the left (Fig. 20). The ejector bars being prevented from ejecting, only the counters associated with these coin compartments will be actuated. The second and third counters will each indicate two, and the fourth, fifth and fourteenth counters will each indicate one, showing that to meet this pay item four twenty dollar gold pieces are necessary, one ten dollar gold piece, one five dollar gold piece, and one fifty cent piece. In the same manner the other items of a pay-roll are struck off on the machine and after an entire roll has been completed each counter will indicate the number of coins of certain denominations which will be necessary for paying off the roll. The operator takes the readings off the various counters and then restores the counters to zero by the counter restoring mechanism. The requisite number of coins are then placed in each magazine compartment and when the segregating lever 72 is restored to its normal position (Fig. 12) the ejector bar controlling bell crank levers 65 will again have the face 71 of the shaft 70 opposed thereto and their rollers 62 become operative to raise the ejector bars and the machine is then ready for paying off the roll.

At the end of the segregation operation the adding machine will have tabulated the various items and after actuation of the totalizing key $t$ the machine will indicate and print the total of the pay-roll thus giving the operator a chance to check up.

The machine having been put in operation for paying off the roll, the operator again sets up the various pay items on the key board and after each setting up operation the main operating lever is actuated and the set-up actuator bars are shifted forwardly and the coins for making up the item, namely four twenty dollar gold pieces, one ten dollar gold piece, one five dollar gold piece, and one fifty cent piece, are ejected into the coin chute to be received from the spout 97 in a pay envelop. At the same time the corresponding counter is actuated, and after the pay roll is completed these counters should aggregate the pay roll total.

As shown in Fig. 3, the locking plates 159 are held against the coins directly above the lowermost coins to be ejected, and as shown in Fig. 10, the tripping mechanism 175, 176 is actuated and the locking plates shifted rearwardly a distance by the arms 156 just after ejection takes place in order that the coins are released and allowed to drop to the bottoms of the magazine sections ready for the next ejection. If any magazine section becomes exhausted, the corresponding locking plate will be shifted forwardly and downwardly into the path of the corresponding ejector bar as has already been described, to block further ejection operation (Fig. 18), such shifting of any locking plate effecting rotation of the shaft 191 by coöperation of the locking plate slot 163 with lever 165, and the restoring bar is locked by pawl 195 to thus more directly lock the main operating lever and to take the strain away from the ejector bars. Before further operation of the machine can be proceeded with it will be necessary to refill the exhausted magazine compartments. The operator may fill in the exhausted compartments over the projecting ends of the respective locking plates, and then swing restoring lever 180 forwardly (Fig. 12) to effect rotation of shaft 187 and coöperation of rollers 188 with the abutments 167 of the forwardly shifted locking plates, these plates being then restored to normal position. However, operation of the machine cannot be proceeded with until the lever 180 has been restored fully to normal (full lines Fig. 12), on account of cam 206 which is in front of the roller 205 on arm 204 extending from shaft 191, this keeping the arm 202 up and the restoring bar locking mechanism in locking position. As soon as lever 180 has been fully restored cam 206 will release the roller 205 and shaft 191 can then rock and arm 202 can swing downwardly to release the locking mechanism pawl 195 from the restoring bar to unlock the machine. If desired the operator can, after the magazine section becomes exhausted, first actuate lever 180 to restore the locking plates, then refill the exhausted magazine sections, and then restore the lever 180 to unlock the machine. The machine remains locked against operation so long as lever 180 has not been fully restored and also as long as segregating lever 72 has not been fully set. Likewise, it is impossible to proceed with further operating of the machine unless the main operating lever is fully actuated after each set-up, the mechanism for preventing this being that shown in Fig. 16 and involving the toothed lever 103 and the stepped plate 105 hereinbefore fully described. All these safe guards will assure accurate and reliable results and furthermore all the locking and guarding mechanism is designed to put the strain on the heavier parts of the machine and to relieve the more delicate parts thereof.

I do not of course desire to be limited to the precise constructions, arrangements and operations herein shown and referred to as modifications are no doubt possible which would still come within the scope of the invention, and I claim as follows:

1. In a machine of the class described, the combination of a coin holder, an ejector bar and means for effecting reciprocation thereof below said holder, a pivot pin, said bar having a longitudinal slot at its rear end to receive the pivot pin, a cam ridge on said bar above the slot therein, cam mechanism for coöperating with said cam ridge as said ridge passes past said pivot pin during reciprocation of the bar for effecting bodily upward swing of the bar when it moves to its rear position and for effecting bodily downward swing of the bar when it reaches its forward position, said bar when in its raised position being adapted to eject a coin from the holder during forward travel thereof but said bar when depressed being free of the coins during its rearward travel.

2. In a machine of the class described, the combination of a coin holder, an ejector bar and means for effecting reciprocation thereof below said holder, a pivot pin, said bar having a longitudinal slot at its rear end to receive the pivot pin, a cam ridge on said bar above the slot therein, cam mechanism for coöperating with said cam ridge as said ridge passes past said pivot pin during reciprocation of the bar for effecting bodily upward swing of the bar when it moves to its rear position and for effecting bodily downward swing of the bar when it reaches its forward position, and a guide plate coöperating with the front end of the bar to hold the bar in raised position during forward travel thereof and to hold the bar in depressed position during rearward travel thereof, said bar during its forward movement being enabled to engage with and eject coins but during rearward travel being prevented from engaging with coins.

3. In a machine of the class described, the combination of a plurality of coin holders, an ejector bar associated with each holder and adapted for longitudinal reciprocation to eject coins, a common actuating mechanism for said ejector bars, a locking plate associated with each ejector bar and held from locking engagement with the ejector bar by coins within the holder, means associated with each locking plate for shifting the same into locking position with reference to the associated ejector bar when the associated coin holder is deficient in coins whereby further movement of the ejector bar is checked by the locking plate, and a main locking mechanism associated with the common actuating mechanism and controlled by the shifting of any locking plate into locking position.

4. In a machine of the class described, the combination of a plurality of coin holders, an ejector bar associated with each coin holder, an actuating train connected with each ejector bar, means for selecting actuating trains for operation, a main operating lever for actuating selected trains to effect simultaneous ejecting movement of the connected ejector bars, a plate associated with each coin holder and held in normal position when there are coins in the holder, a bar connected to be shifted upon operation of the main operating lever, a detent associated with said bar, and a train connecting said detent with said plates and controlled upon shifting of any plate when its associated coin holder lacks coins to effect operation of said detent to prevent shifting of said bar whereby actuation of the main operating lever is prevented.

5. In a machine of the class described, the combination of a plurality of coin holders, an ejector bar associated with each holder and means for reciprocating the bar to effect ejection of coins from the holder if there are coins in the holder, a locking plate associated with each ejector bar and normally held out of locking engagement with the bar by abutting against coins in the associated holder, means associated with each locking plate to effect shifting thereof into locking engagement with its associated ejector bar as soon as all coins have left the holder and the locking plate is no longer held, and resetting mechanism controlled by a lever for simultaneously resetting the locking plates to normal position to allow refilling of empty holders.

6. In a machine of the class described, the combination of a plurality of coin holders, an ejector bar associated with each holder, means for effecting reciprocation of the ejector bars below the respective holders to eject coins therefrom, a locking plate for each ejector bar associated with each coin holder and rendered ineffective so long as there are coins in the holder, means for shifting a locking plate to locking engagement with its associated ejector bar as soon as the respective coin holder is empty, resetting mechanism for resetting actuated locking plates to normal position, and means independent of said locking plates for locking said ejector bars against operation until said locking plates have been fully reset by the resetting mechanism.

7. In a machine of the class described, the combination of a coin holder, an ejector bar mounted to be shifted longitudinally and to swing vertically, means coöperating with the bar to swing it downwardly prior to rearward movement thereof, means coöperating with the bar at the end of its rearward movement to raise the front end thereof into the ejecting plane, setting mechanism for rendering inoperative said means for raising the bar whereby said bar will remain in its lower non-ejecting position during both forward and rearward movement thereof, and means for locking the ejector bar against longitudinal movement until said setting mechanism has been fully actuated.

8. In a machine of the class described, the combination of a plurality of coin holders, an ejector bar associated with each coin holder and adapted to be moved longitudinally and to swing vertically, means adapted to coöperate with each bar to effect upward swing thereof into ejecting position before longitudinal shifting of the bar below the coin holder, cam mechanism normally positioned to allow coöperation of said bar raising means with the bar and adapted to be moved to actuate said means to prevent coöperation thereof with the ejector bars whereby said bars will remain in lower non-ejecting position during longitudinal shifting of the bars, and locking means for preventing shifting of any of the ejector bars until said cam mechanism has been fully set to either effect complete coöperation of the ejector bar raising mechanism with the bars or to fully release such means from the bars.

9. In a machine of the class described, the combination of a coin holder, an ejector bar to the rear thereof, actuating means for shifting said bar forwardly below said holder to effect ejection of a coin, a locking plate above said bar having a head at its front end, means whereby said head will be held outside of the coin holder and above the outer end of said bar when there are coins in the holder, means for shifting said bar forwardly to carry said head into the coin holder and in front of said bar when there are no coins in the holder whereby operation of the actuating mechanism would be prevented, and means controlled upon forward shift of said locking plate in locking position for locking said actuating mechanism against operation independently of said locking plate.

10. In a machine of the class described, the combination of a coin holder, an ejector bar adapted to reciprocate below the coin holder to eject coins therefrom, actuating mechanism for said ejector bar, a plate above said bar extending into the coin holder and against the coins therein above the lowermost coin to hold said coins while the lowermost coin is being ejected, an abutment on said plate, a lever, a spring tending to throw said lever against said abutment to shift said plate rearwardly away from the coins, and trigger mechanism controlled by said actuating mechanism to release said lever after the ejection of a coin whereby said lever may coöperate with the plate to release it from the coins.

11. In a machine of the class described, the combination of a coin holder, an ejector bar reciprocable below said coin holder to eject coins therefrom, a bell crank lever having pin and slot connection at its upper end with said bar, a bail, a lever arm extending from said bail to coöperate with the lower end of said bell crank lever to effect swing thereof when the bail is swung, a selector bar below said bail having an abutment, and a lever for effecting reciprocation of said selector bar to carry its abutment against the bail to effect swing thereof.

12. In a machine of the class described, the combination of coin holders, ejector mechanism associated with each coin holder and normally adapted upon actuation to eject coins from the associated holder, means adapted to be set to prevent ejection during actuation of said ejector mechanisms, and locking mechanism for preventing actuation of the ejector mechanism until complete setting has been made thereof to nonejecting position.

13. In a machine of the class described, the combination with a plurality of coin holders, ejector mechanism for ejecting coins from the holders, means associated with each ejector mechanism for locking said mechanism against actuation when there are no coins in the associated holder, main locking mechanism and means whereby said locking mechanism is actuated when any ejector mechanism locking mechanism becomes effective, means for restoring ejector mechanism locking mechanisms to unlocking condition, and means for preventing unlocking of the main locking mechanism until said restoring mechanism has been fully actuated.

14. In a machine of the class described, the combination of a plurality of coin holders, ejector mechanism associated with each coin holder, means for selecting ejector mechanisms for operation, actuating mechanism for effecting ejecting actuation of selected ejector mechanisms, individual locking mechanism associated with each ejector mechanism for locking it against operation when the associated coin holder is empty, and means controlled by the movement of any individual locking mechanism when in locking position for locking the main locking mechanism against operation.

15. In a machine of the class described, the combination of a plurality of coin holders, ejecting mechanism associated with each coin holder, means for selecting ejector mechanisms for operation, main actuating mechanism for selected ejector mechanisms, main locking mechanism for said main actuating mechanism normally held out of locking association therewith, individual locking mechanism associated with each ejector mechanism for locking it against operation when the associated coin holder is empty, means controlled by the locking operation of any individual locking mechanism for releasing the main locking mechanism to effect locking of the main actuating mechanism, means for restoring actuated individual locking mechanisms to unlocking condition and for at the same time restoring the main locking mechanism to unlocking condition, and means for preventing restoring of said main locking mechanism to unlocking condition until individual locking mechanisms have been fully restored to unlocking position.

16. In a machine of the class described, the combination of coin holders, ejector mechanism associated with each coin holder, actuating mechanism for said ejector mechanisms, said ejector mechanisms being normally in position to eject coins when actuated, locking mechanism for the ejector mechanism actuating mechanisms, said locking mechanism being normally held out of locking association with the actuating mechanism, setting means for setting the ejector mechanisms to prevent ejection thereof when actuated, means whereby upon partial actuation of said setting mechanism said locking mechanism will be released to lock the actuating mechanism and for restoring the locking mechanism to unlocking position only when the setting mechanism has been fully actuated.

17. In a machine of the class described, the combination of coin holders, ejecting mechanism associated with each coin holder, actuating mechanism for the ejecting mechanisms, setting mechanism operable to set the ejecting mechanisms for ejection or non-ejection during actuation thereof, locking mechanism for the ejector mechanisms normally out of locking association therewith, and means controlled upon operation of the setting mechanism for releasing said locking mechanism for locking association with the ejector mechanisms and for preventing restoration of the locking mechanism to unlocking condition until said setting mechanism has been fully actuated to put the ejector mechanisms either into ejecting condition or non-ejecting condition.

In witness whereof, I hereunto subscribe my name this 29th day of Sept., A. D. 1914.

JOSEPH RABER.

Witnesses:
 Wm. J. Belknap,
 George E. Moore.